UNITED STATES PATENT OFFICE.

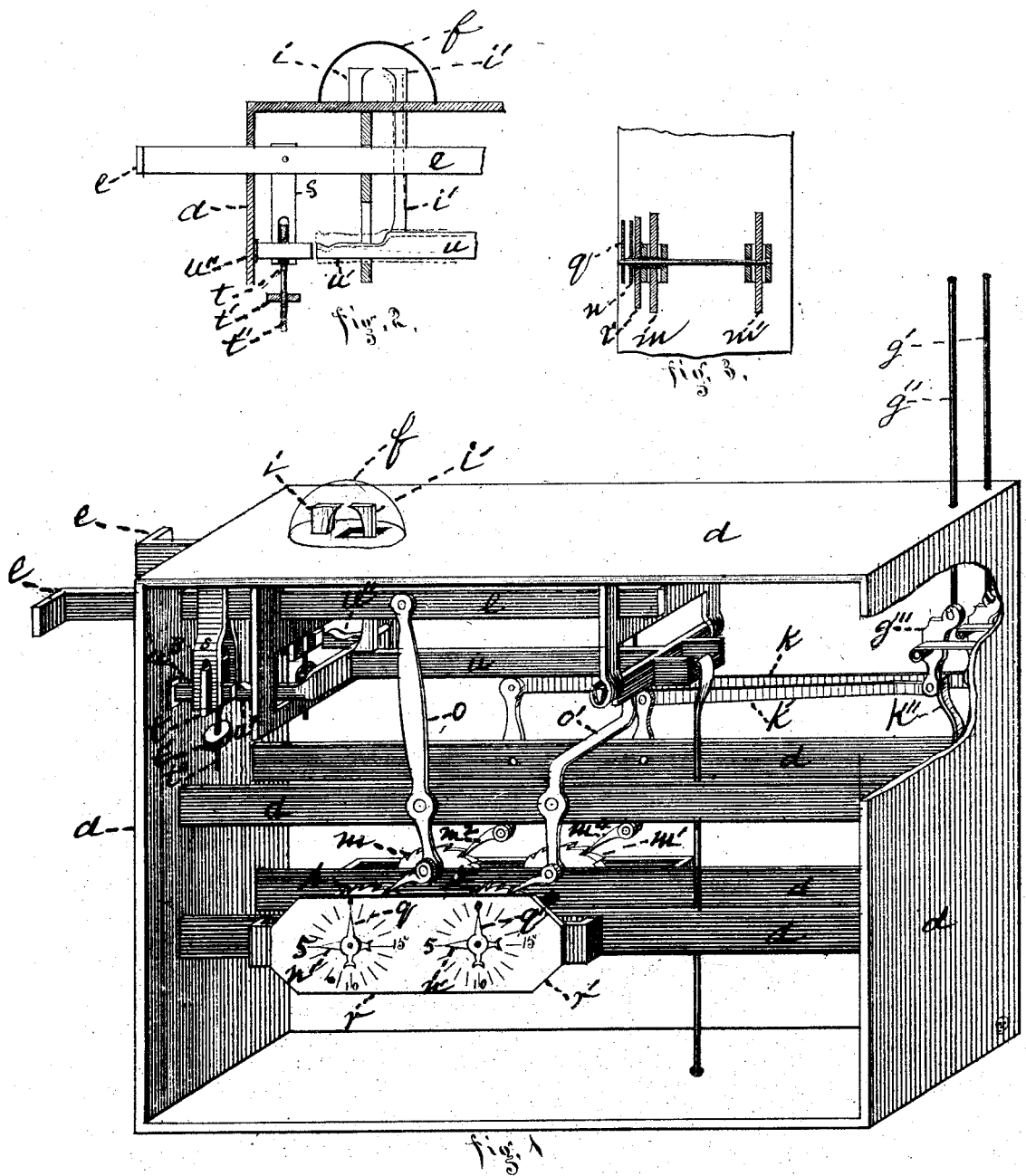

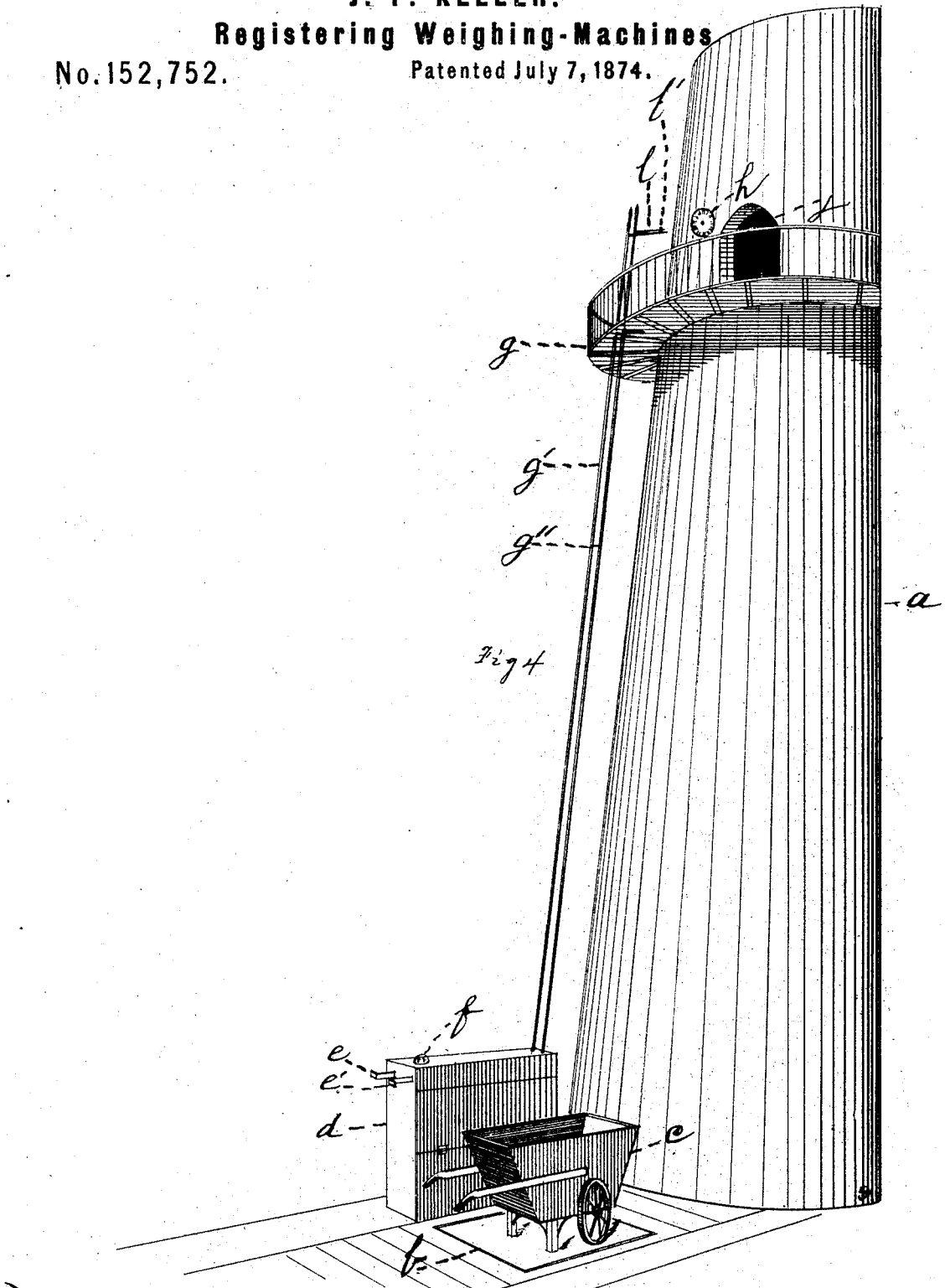

JOEL F. KEELER, OF PITTSBURG, PA., (HIRAM J. KEELER, ADMINISTRATOR.)

IMPROVEMENT IN REGISTERING WEIGHING-MACHINES.

Specification forming part of Letters Patent No. 152,752, dated July 7, 1874; application filed June 5, 1871.

*To all whom it may concern:*

Be it known that I, JOEL F. KEELER, of the city of Pittsburg, in the county of Allegheny and State of Pennsylvania, have invented a new and Improved Mode of Constructing Weighing-Scales and their appendages, whereby more accurate weighing may be made, and more accurate accounts kept of such weighing than has hitherto been done; and I do declare that the following is a full, clear, and exact description of the same, reference being had to the accompanying drawings, and to the letters of reference marked thereon, in which—

Plate B represents one of my scales constructed for weighing and registering the stock to be put into a furnace for smelting ores, and connected with such furnace. Plate A represents enlarged views of the several parts thereof, and the mode of operating them in the weighing and registering of the several kinds of stock used, and the time of weighing or of putting the several kinds and charges of stock into the furnace.

Letter $a$ represents the furnace; $b$, the platform of the scale. $c$ is the cart upon the platform ready for filling. $d$ represents the box or frame containing the scale-beam and other parts; $e$ and $e'$, the handles of the shifters, which change the positions of the counterpoises. $f$ is the glass cover fastened over the indexes $i$ and $i'$, which indexes show when the beam is at a balance. $g$ is the platform at the top of the furnace, where the furnace-filler receives the carts of stock from the cart filler and weigher. $g'$ and $g''$ are levers, by which the kinds of stock are re-registered by the furnace-filler; and $l$ and $l'$ are pins attached to $g'$ and $g''$, which mark the time on the clock-dial $h$, at the same time, in this instance, at which the re-registering is made. $j$ is the hole into the furnace, through which the stock is dumped after it is re-registered. $k$ and $k'$ are connecting-bars, and $k''$ is a spring, through which the levers $g'$ and $g''$ operate the toothed wheels $m$ and $m^1$ and the indexes $n$ and $n'$, respectively, while $o$ and $o'$, being operated by $e$ and $e'$, operate, in turn, the toothed wheels $p$ and $p'$ and the indexes $q$ and $q'$ over the dial-plates $r$ and $r'$, respectively.

To enable others skilled in the art to make and use my invention, I will proceed to describe it more fully.

I make my weighing-scale of any known form, whether as a single vibrating beam having arms of equal or unequal length, or as a compound beam; but I usually make it of the form known as the "platform-scale;" and I adapt and use it for weighing every known material, for every known use and purpose, but especially, as shown in the drawing, for weighing and registering the several articles known as "stock" for smelting-furnaces, particularly those for iron ores.

Heretofore weighing-scales have been so made as not to oblige the users thereof to make an accurate account of the drafts made by the scale; nor indeed to actually put onto the scale the exact amount of weight at each draft which they professed to weigh.

In order to remedy these defects I construct my weighing and registering scale so as to fit it for weighing correctly several articles separately or together. I make the beam with one or more branches, or with several poises on one beam, or with several beams, (separate or connected,) according in number with the several articles or kinds of stock to be weighed, and compounded, or mixed, in the furnace, or otherwise.

As shown in the drawings, I prefer to make a single beam, $u$, with branches $u'$ and $u''$. I provide each branch with a counterpoise, $t$, made variable in weight by any known method, of any known form, and of any known materials. Directly opposite each branch or beam is a corresponding pin, $u^3$, attached to anything that will hold it in position for receiving the counterpoise $t$ when the beam is at a balance, and only then.

In this instance the counterpoise is in the form of a sleeve, with a screw-bolt, $t''$, at its bottom, onto which weights $t'$ may be and are screwed at will, for increasing its gravity, and unscrewed therefrom for decreasing the same to such a pressure on the beam as will balance the weight desired.

A notch near the end of the branch or beam receives the counterpoise as soon as it is placed on the beam, and it is therefore at once ready to balance the exact amount of weight required to be put on the scale. When thus brought to a balance, its beam or branch being directly opposite to its pin, the poise is shifted, by any known device—in this case, by the shifters $e$ and $e'$—onto such pin, and retained there until again wanted for weighing the particular article which it represents. The hole in the counterpoise, (forming the sleeve,) being but slightly larger than the branch or the retaining-pin, permits the counterpoise to be slipped off the branch and onto the pin, or vice versa, only when the beam is at, or nearly at, an exact balance; consequently each branch and its corresponding pin become mutual stops for the counterpoise, except when the beam is at a balance, as shown in Plate A, Figure 2.

This arrangement and construction, as will readily be seen, compels the exact amount of weight represented by each counterpoise to be put on the scale before the counterpoise can be removed from the beam and another be put on. Shifting devices with handles $e$ and $e'$, (shown on the outside of the scale-frame $d$,) enable the operator to shift or move the counterpoise, when, as before said, the beam is at a balance. Connected with each shifter is a dog or catch, $m^2$ and $m^4$, which, as the shifter is moved back and forth, operates the toothed wheels $m$ and $m^1$ and $p$ and $p'$, and the indexes $n$ and $n'$ and $q$ and $q'$, connected with them over the graduated dial-plates $r$ and $r'$, which show the number of drafts made by each counterpoise. Indexes $i$ and $i'$, one of which, $i'$, is attached to the vibrating beam $u$, show when the beam is at a balance. These indexes are covered by a glass cover, $f$, and all the other parts of the scale machinery are also covered, so that the operator can affect the draft only through the platform $b$, or that part of the scale holding the weight weighed, and this is usually so placed and arranged that he cannot touch it while operating the shifters $e$ and $e'$; but since the operator might designedly or otherwise use a counterpoise or a beam for weighing a given kind of stock which was intended to weigh or represent another kind, and thus defeat the intention of the manager, (who had adjusted and labeled each counterpoise,) I have provided for an additional register, to be operated or kept by some other person than the weigher. In this instance it is kept by the furnace-filler, at the top of the furnace, who, on receiving a cart or charge of stock to be put into the furnace, examines the contents, and re-registers the several articles in any known way, but in this instance by operating, through the levers $g'$ and $g''$, the ratchet-wheels $m$ and $m^1$ and the indexes $q$ and $q'$. The indexes $n$ and $n'$ having been operated by the weigher before sending the articles to the furnace-filler, it will be obvious that the indexes should be over each other on each dial-plate after each article weighed has been put into the furnace. If they are not so they indicate some error, either on the part of the weigher or the filler. As regularity in time in many operations is important, and in few more so than in that of filling stock into a smelting-furnace, I have endeavored to secure it by providing a time-register, to be operated by the weigher or some one connected with the furnace. In this instance it is operated by the furnace-filler, who operates it at the same movement by which he re-registers the name of the stock by pricking by the pins $l$ and $l'$, or marking the paper or other dial, which is made to revolve by clock-work, and shown at $h$, and the several circular lines on it show the several kinds of stock.

When operated by the weigher, the time-register is connected, by any known means, with the shifter $e$, though I do not in all cases require the two registers to be operated together, but separately, and in combination with one or more of the other devices herein shown, if circumstances should require it.

The advantages of my improvement are numerous. First, the exact amount prescribed for each kind of material to be weighed is secured, as no register of the draft can be made if too much or too little is put on the scale. Second, the exact kinds of material prescribed are secured (or detected, if not used) by the re-registering of the stock by the furnace-filler or other person. Third, regularity in the filling the furnace is secured by the time-register, since the re-registering levers $g'$ and $g''$, on being operated for re-registering the stock, make their impressions on the time-dial $h$ through their pins $l$ and $l'$, respectively, on the same radial line of the time-dial's face for all kinds of stock sent at one time in a given cart, and hence the times of all kinds sent at once are re-registered at one and the same time.

In some cases I make the weight-registering and the other devices independent of any shifting devices, especially in scales having separate beams, each weighted for a particular kind of stock; but even in such cases the registers are so constructed that they can be operated only when their respective beams are brought to a balance.

I claim—

1. The beam $u$, the counterpoise $t$, and the retaining-pin $u^3$, when constructed and arranged in relation to each other and operated substantially in the manner and for the purposes described.

2. The weight-registering device $m^2$, $m$, $n$, and $v$, constructed and operated, in combination with the beam $u$ and its appendages, substantially as and for the purposes described.

3. The re-registering device $g'$, $m$, and $q$, &c., in combination with a weight-register and a weighing-scale, substantially as described.

4. The time-registering device $g'$, $l$, $h$, &c., in combination with the weight-registering device of a weighing-scale, substantially in the manner described, and for the purposes set forth.

JOEL F. KEELER.

Witnesses:
O. M. EDWARDS,
W. N. PAXTON.